United States Patent Office 3,535,433

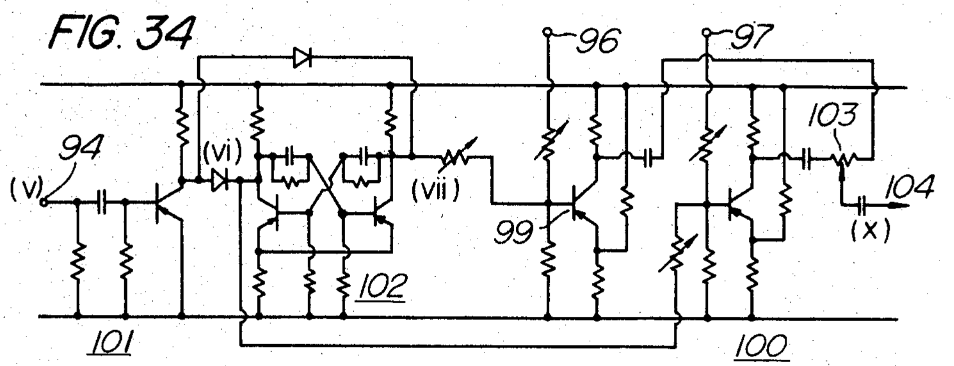
FIG. 35
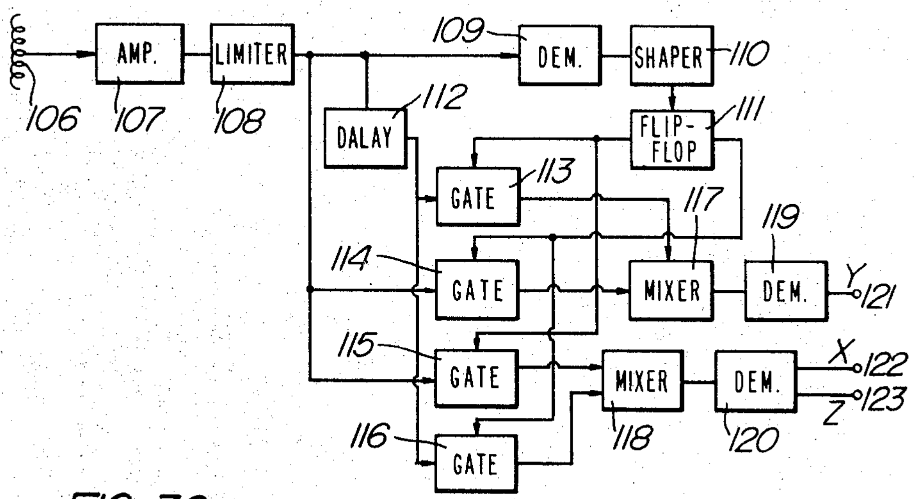
FIG. 36
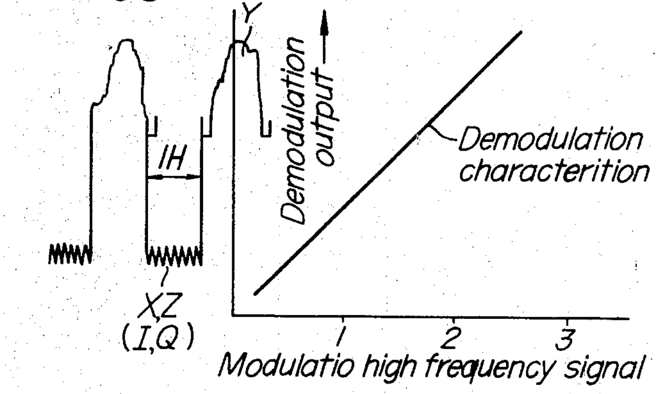

Patented Oct. 20, 1970

3,535,433

SYSTEM FOR TRANSMITTING OR RECORDING AND REPRODUCING A PLURALITY OF SIGNALS

Ichiro Arimura, Kyoto, and Hiromichi Tanaka, Moriguchi-shi, Japan, assignors to Matsushita Electric Industrial Co., Ltd., Osaka, Japan, a corporation of Japan Filed Oct. 3, 1966, Ser. No. 583,719

Claims priority, application Japan, Oct. 7, 1965, 40/62,066; Jan. 18, 1966, 41/3,490; Feb. 15, 1966, 41/8,639, 41/8,640; Aug. 25, 1966, 41/80,858

Int. Cl. H04n *1/28*

U.S. Cl. 178—5.2 10 Claims

ABSTRACT OF THE DISCLOSURE

A system for transmitting or recording and reproducing a plurality of signals such as a color television signal having two types of modulation and/or demodulation system, one including a demodulator in which first and second information signals contained in a frequency modulated pulse wave are demodulated by matrix method by cancelling the area between different zero crosses of the pulse whose one has the first information and the other has the second information, and the other being a modulation system in which a pulse wave subjected to frequency modulation by a first information signal is modulated in width by a second information signal with respect to one of the leading and trailing edges of the frequency-modulated pulse.

This invention relates to a method and apparatus for transmitting, recording and reproducing a plurality of signals, and more particularly, relates to a modulation and demodulation system and a recording and reproduction system which are conveniently used in recording and reproduction systems comprising a magnetic tape and one or more transducers for reproducing wide band signals, whereby a luminance signal and a chrominance component or components in a color television system, such as NTSC system, PAL system or SECAM system, are reproduced.

In a conventional magnetic recording and reproducing apparatus which is capable of recording broad-band signals, a beat is encountered as an obstacle between a chrominance carrier and a modulation carrier from a modulator during the recording operation, even if the recording and reproducing frequency band of the apparatus is broad enough, when the magnetic recording and reproducing apparatus is recording or reproducing a composite signal according to one of the above color signal systems. And also it cannot faithfully reproduce chrominance components owing to variation of the time axis of the magnetic medium.

Also, a large scale compensation apparatus for variation of the time axis is required, even if faithful reproduction of chrominance components is possible.

By the recording and reproducing operation, whereby a composite signal by NTSC system, for example, is decomposed, and each of the luminance signal Y and the chrominance components I, Q are recorded and reproduced by respective channels, there is no effect in the change of time axis by jitter. However, the circuit in a frequency multiplex system, wherein two components I and Q are modulated simultaneously, is quite complicated, and suffers from the problem of beat.

Taking into consideration the deficiencies associated with prior arts, the main object of this invention is to provide two kinds of special modulation or demodulation methods for modulating two signals in one channel.

Another object of this invention is, in an apparatus of the adapted for recording and reproducing broad band signals, including a magentic tape and a magnetic transducer or magnetic transducers, to provide methods or apparatus to record and reproduce a multiplex signal comprising a luminance signal and a chrominance component or two chrominance components, which are decomposited components in the above described various color signal systems, with one channel system or two channel systems, at a reduced number of signals by adopting sophisticated special modulation and demodulation, without spoiling too much the characteristic of color information.

Still another object of this invention is to provide two kinds of color video recording and reproducing apparatus of the character of two channels system, wherein one of the channels is for luminance signal, and the other channel is for chrominance components using the above described two special modulation and demodulation systems.

Still a further object of this invention is to provide two color video recording and reproducing systems of one channel system to produce luminance signal and chrominance components carrying the same information during successive two horizontal scanning periods, during reproducing as one channel by line sequential switching of one channel signal whereby the above described two special modulation and demodulation system is adopted for chrominance components, and adopting one horizontal scanning time delay method during reproduction.

Other objects and advantages of this invention will be made apparent by the following description.

In the following description, embodiments of this invention are explained in detail with reference to the annexed drawings.

FIG. 34 is a circuit diagram of an embodiment of that shown in FIG. 32;

FIG. 35 is a block diagram of the apparatus shown in FIG. 31 during reproduction;

FIG. 36 is a diagram of the demodulation characteristic of the demodulation circuit shown in FIG. 35;

Firstly, a conventional magnetic recording and reproducing apparatus having two rotary magnetic heads will be explained with reference to FIGS. 1 to 4.

Figure 1:
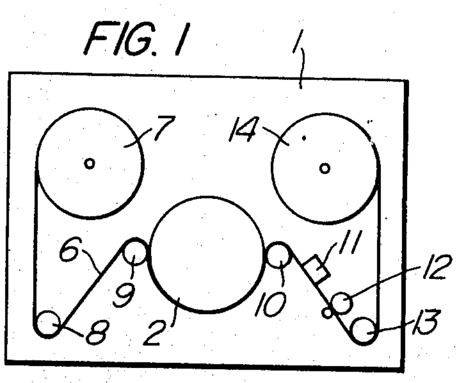
FIG. 1 is a diagram showing the mechanism of a conventional magnetic reproducing apparatus having two rotary magnetic heads.
Figure 5:
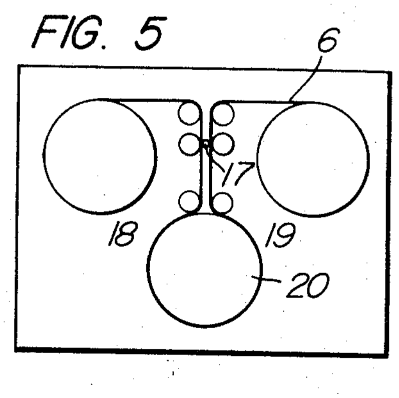
FIG. 5 is a diagram to illustrate the mechanism of a conventional magnetic reproducing apparatus having one rotary magnetic head.
Figure 2:
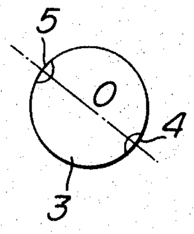
FIG. 2 is a top view of a rotary disc which is a part of the mechanism shown in FIG. 1.

A base plate 1 is normally called a tape transport panel. 2 denotes a cylindrical tape guide, including therewithin a rotary head disc 3, as shown in FIG. 2, and provided with a slit through which each end portion of both magnetic heads 4 and 5, which are mounted on the rotary head drum, projects. The axis of the tape guide 2 is slightly sloped against the base plate 1. Accordingly, the rotary head disc 3 which is constructed on the same axis with the tape guide 2 and a driving motor 5' of the rotary disc are also sloped in a similar manner with the tape guide 2. A magnetic tape 6 is supplied from a supply reel 7, and contacts with the tape guide 2 via first idler 8, which has an axis perpendicular to the base plate 1, and second idler 9, which is sloped in a similar manner with the tape guide 2. The tape 6, after recording and reproducing by the magnetic heads 4 and 5 which are mounted diametrically on the rotary disc 3, is rolled up on a take up reel 14 via another idler 10, a control signal head 11, capstan mechanism 12 and another idler 13.

Figure 3:
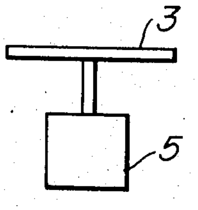
FIG. 3 is a front view of the disc shown in FIG. 2.
Figure 4:
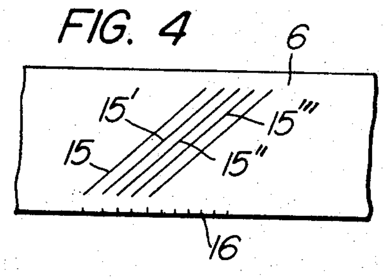
FIG. 4 is to illustrate the tracks recorded on a magnetic tape by the apparatus shown in FIG. 1.

The construction of the rotary disc 3 is as shown in FIGS. 2 and 3. The rotary disc 3 has a center O, and is provided with two magnetic heads 4 and 5 arranged diametrically thereon, and is driven by a synchronous motor or a motor 5' of similar characteristic. Since the rotary disc is slightly sloped against the passage of the tape, the record tracks are produced by the magnetic heads 4 and 5 as alternatively positioned magnetized bands 15, 15', when the magnetic tape 6 is passed along and in contact with the periphery of the rotary disc 3 of the character. A servo circuit is provided to control the rotary disc or capstan to retrace the recorded magnetized bands strictly during reproduction with a reference signal produced by reproduction of control signals 16 which are recorded on the lower end of the tape 6 during recording.

In the NTSC color television, if the rotary disc is rotated at a rate of 1800 r.p.m., a television information of one field is recorded on each one of the tracks of a magnetic tape by one rotation of the disc. As a practice, the rotary disc is rotated in synchronism with a vertical synchronizing signal of NTSC system composite signal, and the neighbourhood of the vertical synchronizing signal is controlled in its rotation phase so as to be recorded at the tape end part of the tracks. Thus the change over portion of the tracks does not appear in the reproduced image.

In a magnetic recording and reproducing apparatus having a single rotary magnetic head, a magnetic tape 6 is wound on substantially the whole periphery of a rotary disc 20 via a capstan 17 and two idlers 18 and 19. The rotary disc 20 is rotated at a rate of 3600 r.p.m., and a television information of one field is recorded during one rotation of the disc.

Some problems associated with magnetic recordings and reproducing operation will be described before the explanation of this invention.

Figure 6:
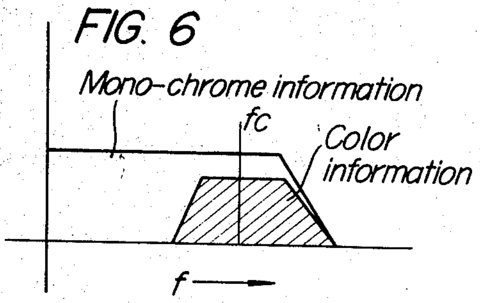
FIG. 6 is a diagram to show respective bands occupied by each information in color television transmission.

As a common principle of various color television systems such as NTSC system, PAL system or SECAM system, a so-called color subcarrier system is adopted as shown in FIG. 6. In the color subcarrier system, a chrominance information wherein I.Q. chrominance components are balanced modulated with a centre frequency of 3.58 mc., or a chrominance information wherein $R-Y$, $B-Y$ chrominance components are frequency modulated with a center frequency of 4.43 mc. during each horizontal scanning, is superposed with a monochrome information band. By the above systems, wave forms are remarkably deformed even if the recording- and reproducing operation is performed by a broad band magnetic recording and reproducing apparatus. Such deformation is caused owing to the recording and reproducing course of FM signals including a frequency modulator and demodulator, a tape and magnetic heads. Especially, a beat, which occurs between the color subcarrier and the frequency modulation carrier, affects the reproduced image. Also reproduced images will be irregular owing to variation of the time axis of a magnetic recording and reproducing system, because the I.Q. signals are transmitted by an angular modulation. To avoid above described obstacles by recording of composite television signals according to the NTSC system, PAL system or SECAM system, a very complicated apparatus of large size, including a low frequency FM modulator and demodulator using frequency conversion and a compensation apparatus for time axis variation, is necessary.

This invention is to provide a novel method to eliminate the above obstacles and to make the circuit thereof simple, whereby a composite color television signal is decomposited into a luminance signal and chrominance components, and the luminance signal and the chrominance components are transmitted by respective channels, whereby two chrominance components are transmitted by a single channel.

Firstly, two types of modulation system of this invention, whereby two chrominance components are transmitted by a single channel, will be explained.

The first modulation system illustrated in FIGS. 7 to 14 is to utilize effectively a transmission line by modulating alternately the temporal positions of the zero crossover points of a free-running pulse waveform according to the levels of two modulation signals by using a frequency modulator or pulse width modulator, and then transmitting the two modulation signal informations included between the zero crossover points, and further demodulating said two modulation signals by using a demodulation system which will be explained hereinafter. Now, "zero crossover points" represent the fall point and rise point of a pulse waveform.

Figure 7:
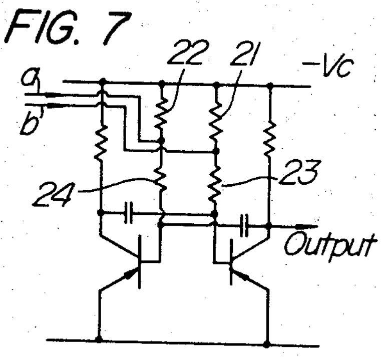
FIG. 7 is a circuit diagram of an embodiment of a modulator in the first modulation system of this invention.

The modulation circuit shown in FIG. 7 is a transistor astable multivibrator, which is an example of so-called frequency modulator whereby the on-off operation point of the base thereof is varied by a modulation signal. It is a common practice to constitute such a frequency modulator to be modulated by a single signal, wherein two resistances 21 and 22 are used in common. On the contrary, according to this invention, two signals to be modulated are supplied separately to each branching point of resistances 21 and 23, and 22 and 24.

Assuming that the ON-OFF points of the modulator very linearly corresponding to the level of a modulation signal, the ON-OFF points of the multi-vibrator vary as illustrated by $x_1$, $y_1$; $x_2$, $y_2$; etc. in FIG.8 (i), corresponding to the levels of two modulation signals *a* and *b*. Accordingly there occur the informations *a* and *b* alternatively between the ON-OFF points or zero crossover points of the rectangular output waves.

Figure 8:
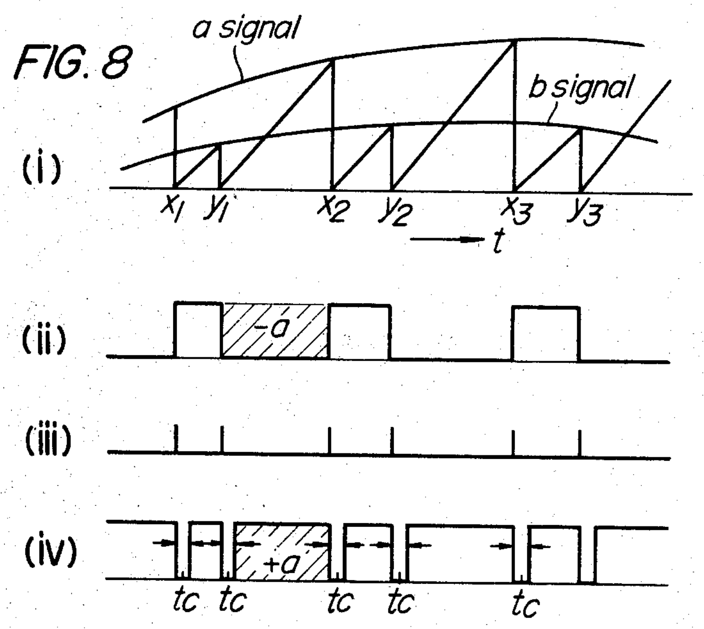
FIG. 8 shows operation wave forms to illustrate the principle of modulation according to the first modulation system of this invention.

Next the demodulation process of the modulated waves of signals *a* and *b* as illustrated in FIG. 8 (ii), after those signals are transmitted, will be explained. In the first, the direction of the areas of each wave form will be considered. The positive direction signal information *b*, such as $\overline{x_1y_1}$, $\overline{x_2y_2}$ and so on, at each time, and the negative direction signal information *a*, such as $\overline{y_1x_2}$, $\overline{y_2x_3}$, etc. at any time, are arranged alternatively with respect to time, and the $b-a$ signal can be obtained from those signals.

On the other hand, pulses as shown in FIG. 8 (iii) are obtained by differentiating the wave form of FIG. 8 (ii). It is possible to obtain outputs having a different duty ratio as shown in FIG. 8 (iv), by triggering the monostable multivibrator with the pulses shown in FIG. 8 (iii). As to the direction of the area of this wave form shown in FIG. 8 (iv), the informations *a* and *b* are positive direction outputs, the negative direction outputs of a certain period being subtracted from each time $\overline{xy}$. A signal $a+b$ can be obtained from the positive direction outputs, accordingly, the signal *a* becomes zero and only the signal *b* is demodulated by superposing two wave forms of FIG. 8 (ii) and FIG. 8 (iv) at a suitable ratio, and passing the superposed wave forms through a low band pass filter. A practical demodulation circuit to perform the above described process will be explained with reference to FIG. 9. The signal of the wave form shown in FIG. 8 (ii) is applied to a terminal 25, and the pulse as shown in FIG. 8 (iii) is obtained by a cross-over detector 26 and triggers a monostable multivibrator 27, the output of which, as shown in FIG. 8 (iv), is added to the input signal by an adder 28, and is passed through a low band pass filter 29, and thus the signal *b* is demodulated at an output terminal 30. In case the polarity of the wave form of FIG. 8 (iv) is reversed, the signal *a* is demodulated. The above described demodulation means is to demodulate a signal *b* (or *a*) by matrix method by cancelling the areas between different zero crosses, one of them having an information *a* (or *b*), and the other having an information $-a$ (or $-b$). The hatched parts in FIG. 8 illustrate the areas having the information $-a$ or the information $+a$ respectively.

Figure 9:
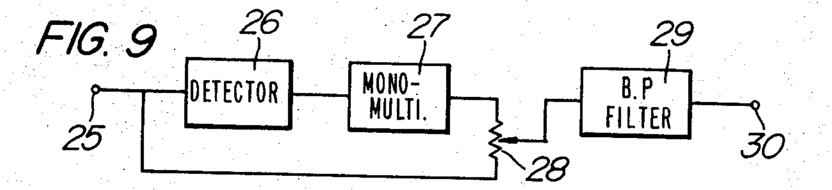
FIG. 9 is a block diagram of a demodulator in the first modulation system of this invention.
Figure 10:
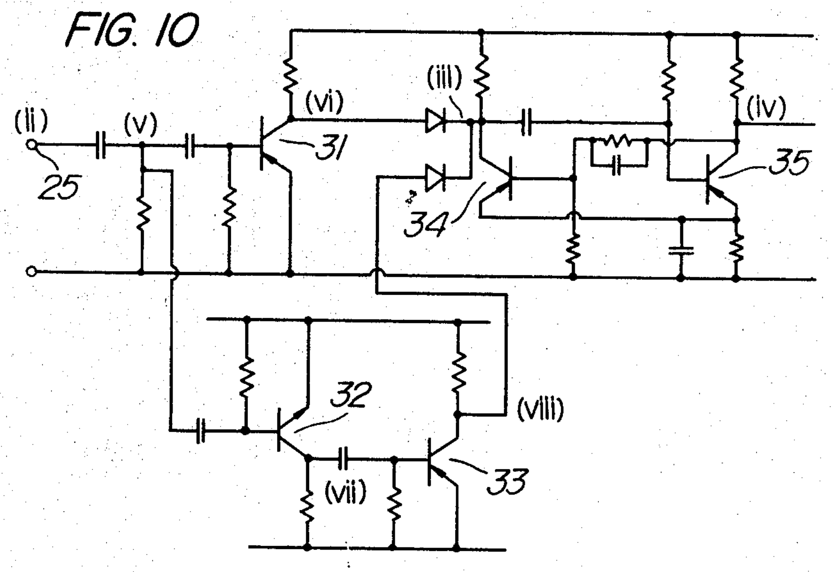
FIG. 10 is a circuit diagram of an embodiment of a demodulator shown in FIG. 9.
Figure 11:
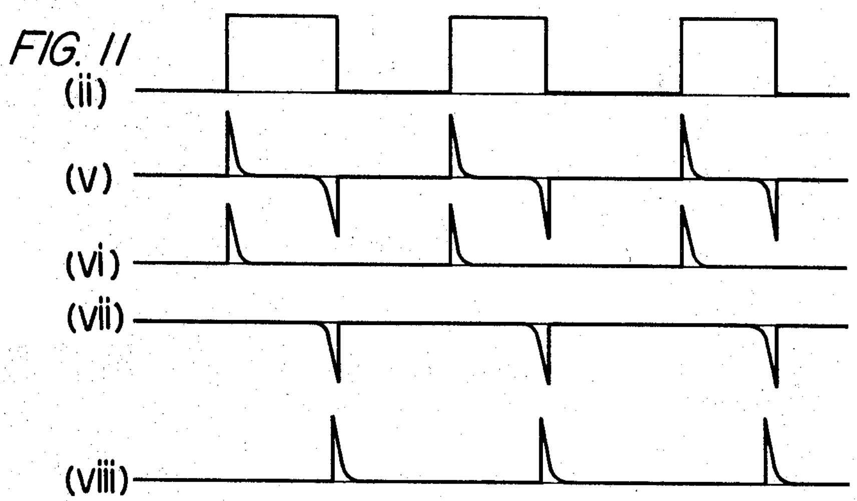
FIG. 11 shows operation wave forms of the circuit shown in FIG. 9.

An embodiment of the demodulator shown in FIG. 9 will be explained referring to FIGS. 10 and 11. Transistors 31, 32 and 33 form pulse amplifiers, and transistors 34 and 35 form a monostable multivibrator. A signal (ii) in FIG. 11 (as illustrated in FIG. 8 (ii)) is applied to the terminal 25 and is then differentiated, and the respective components of positive polarity and negative polarity as shown in FIG. 11 (v) are amplified by the pulse amplifiers to have the same polarity, thus the respective zero cross points are used as trigger input to the monostable multivibrator of the next stage. FIGS. 11 (vi) to (viii) illustrate the wave forms of the corresponding respective circuits shown in FIG. 10.

Figure 12:
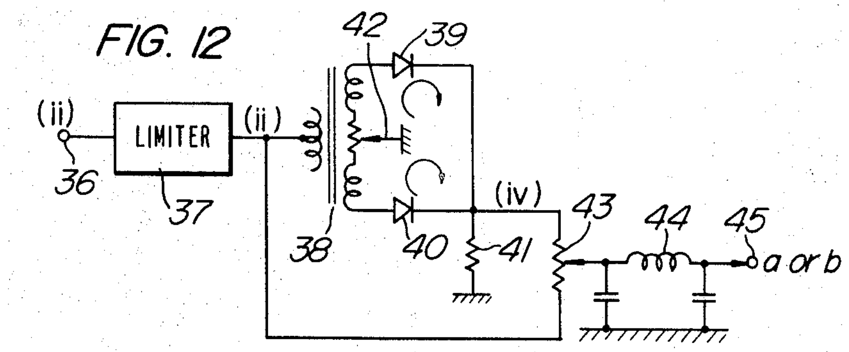
FIG. 12 is a circuit diagram of another embodiment of a demodulator of this invention.
Figure 13:
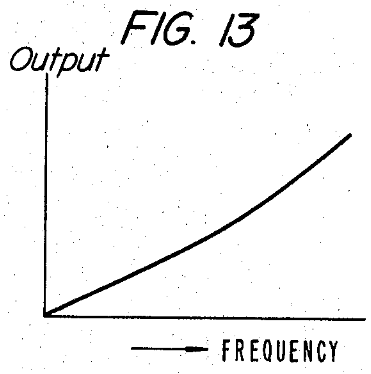
FIG. 13 is a characteristic curve of a demodulation transformer in the circuit shown in FIG. 12.
Figure 14:
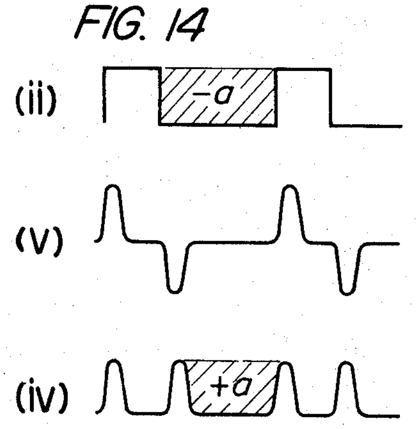
FIG. 14 shows operation wave forms of the circuit shown in FIG. 12.

Another embodiment of the demodulation means will be explained with reference to FIGS. 12 and 14. The modulated wave of the wave form shown in FIG. 8*ii* is generally applied to an input terminal 36, when it is demodulated through any transmission system, and then the amplitude modulation component is eliminated through a limiter stage 37. The output thereof is passed through a transformer 38 having a differential characteristic, and an output as shown in FIG. 8*iv* across a resistance 41. This output is added to the transformer input signal (*ii*) with a variable resistance 43, and is converted to a modulated signal having only a signal component *a* or *b*, and then demodulated to a signal *a* or *b* through a low band pass filter 44. The transformer 38 is of a frequency characteristic as shown in FIG. 13, and is designed as a spike transformer. In the circuit of the diodes 39 and 40, the output in the direction as shown by an arrow is of a wave form as shown in FIG. 14*v*, and an output as shown in FIG. 14*iv* appears across the resistance 41, since the middle point of the secondary of the transformer 38 is grounded through a balancing variable resistor 42. The width of the spike of output (*iv*) varies depending upon the design of transformer 38 or the wave form of the input signal (*ii*), and is generally of a certain constant amount. Accordingly, the areas $-a$ and $+a$ between the zero cross points of FIG. 14 can be treated in a similar manner with the output of the above described mono-stable multivibrator, and added together by a mixer 43, and the signal *b* is demodulated at an output terminal 45 through a low pass filter 44. It is, thus, to be noted that the demodulation is essentially due to detection of the temporal positions of the positive and negative going zero crossover points of such a modulated wave pulse.

The second modulation- and demodulation-system will be explained with reference to FIGS. 15 to 19. This modulation system is characterized in that one of the rising and falling zero crossover points of a carrier signal is modulated by a certain signal, and the other of the falling and rising zero crossover points of the carrier signal is modulated by the sum of said modulation signal and another signal, by pulse-width modulation of one of the rising and falling zero crossover points of a rectangular carrier or a pulse wave form, which is frequency modulated or pulse-width modulated by a certain signal, by another signal, whereby two signals can be transmitted with a single transmission line, and a circuit, which is simpler compared to conventional time division or frequency division multiplex system, can be used.

Figure 15:
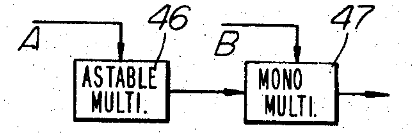
FIG. 15 is a block diagram of a modulator of the second modulation system of this invention.
Figure 16:
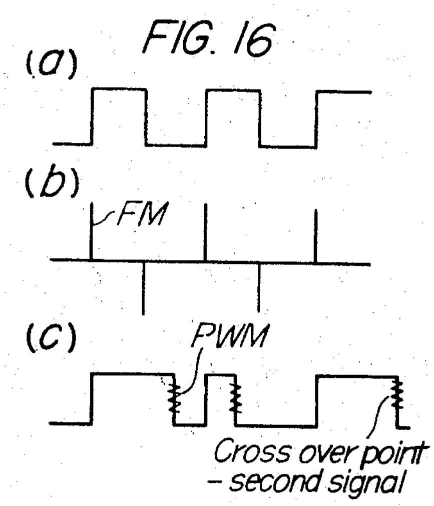
FIG. 16 shows operation wave forms of the modulator of FIG. 15.
Figure 17:
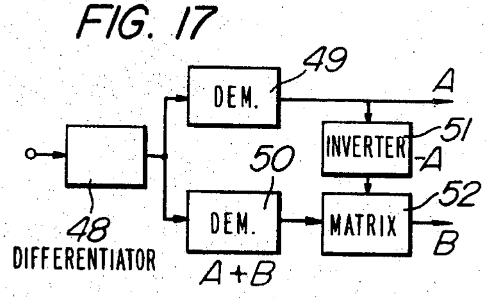
FIG. 17 shows a block diagram of a demodulator of the second modulation system of this invention.
Figure 18:
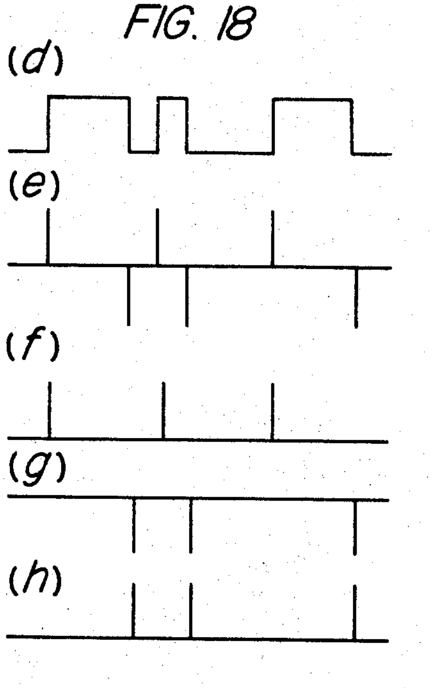
FIG. 18 shows operation wave forms of the demodulator shown in FIG. 17.

In FIG. 15, an astable multivibrator 46, used as an FM oscillator, is frequency modulated by a signal A. The modulated wave, which is obtained with the above process, is pulse width modulated at its rising point or at its falling point by a mono-stable multivibrator 47, which is used as a pulse width modulator. The wave forms of the respective parts are as shown in FIG. 16, wherein the wave form (*a*) is a frequency modulated wave or a pulse width modulated wave modulated by a signal A, and the wave form (*b*) is a pulse wave which is the rising portions of the wave form (*a*), and one of the positive and negative going pulses of the wave form (*b*) (which is the positive going pulse in the embodiment) is made a trigger pulse for driving a monostable multivibrator described later and the multivibrator is triggered by the trigger pulse and then the output of the circuit is pulse-width modulated by a signal B with respect to the time axis of the trigger pulse, thus developing a rectangular wave (*c*) at its output. Accordingly, the rising and falling portion of the wave from (*c*) thus obtained are determined by the information signals A and A+B, respectively. Thus the signal of wave form (*c*) is transmitted as the required signal. To demodulate the signal which is modulated by the process above described, the modulated wave form as shown in FIG. 18*d* is differentiated by a differentiating circuit 48 as shown in FIG. 17, the differentiated pulse is shown in FIG. 18*e*. The differentiated pulse is then decomposed into positive pulses and negative pulses as shown in FIGS. 18*f* and *g* respectively. By demodulating the decomposed positive pulse signal and negative pulse signal wth two demodulation circuits 49 and 50, (each demodulation circuit being adapted to respective modulation system,) the signal A, which has been frequency modulated or pulse width modulated, is demodulated by the demodulator 49, and the sum of the signal A, which has been frequency modulated or pulse width modulated, and the signal B, which has been pulse width modulated, is demodulated by the demodulator 50. These two demodulated signals are introduced to a matrix circuit 52. Namely, the signal A is introduced to an inverting circuit 51, whereby the signal A is inverted and is added to the output A+B of a demodulation circuit 50. By the process above described, the signal B is obtained.

Figure 19:
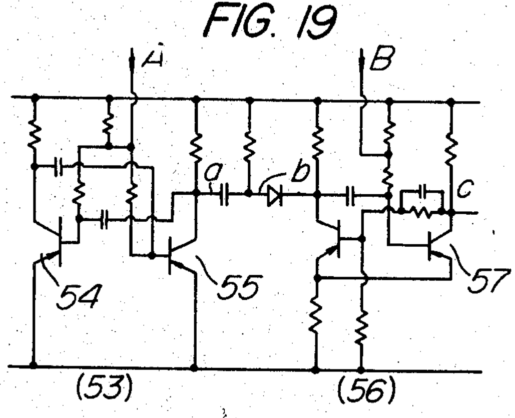
FIG. 19 is a circuit diagram of the embodiment of the modulator shown in FIG. 15.

Further, an embodiment of the modulation circuit is shown in FIG. 19, the operating point of each base of transistors 54 and 55 which constitute an astable multivibrator 53 is varied by a signal A, and the operating point of the base of transistor 57, which constitutes a monostable multivibrator 56 is varied by a signal B. Thus the output signal is modulated. The wave forms at points *a*, *b* and *c* in FIG. 19 correspond respectively to the wave forms at points *a*, *b* and *c* in FIG. 16.

The modulation- and demodulation method is made clear by the above two embodiments.

Nextly, a practical combination of the modulation system above described with a color television signal recording- and reproducing-apparatus is explained.

Figure 20:
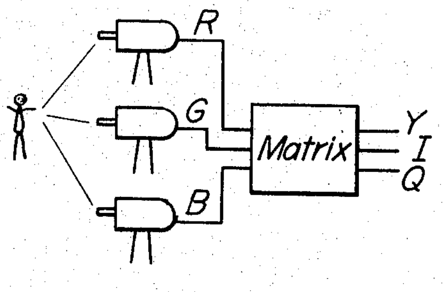
FIG. 20 is a diagram to illustrate outputs taken from cameras for a color television signal of NTSC system.
Figures 21, 22, 23, 24, 25, 26:
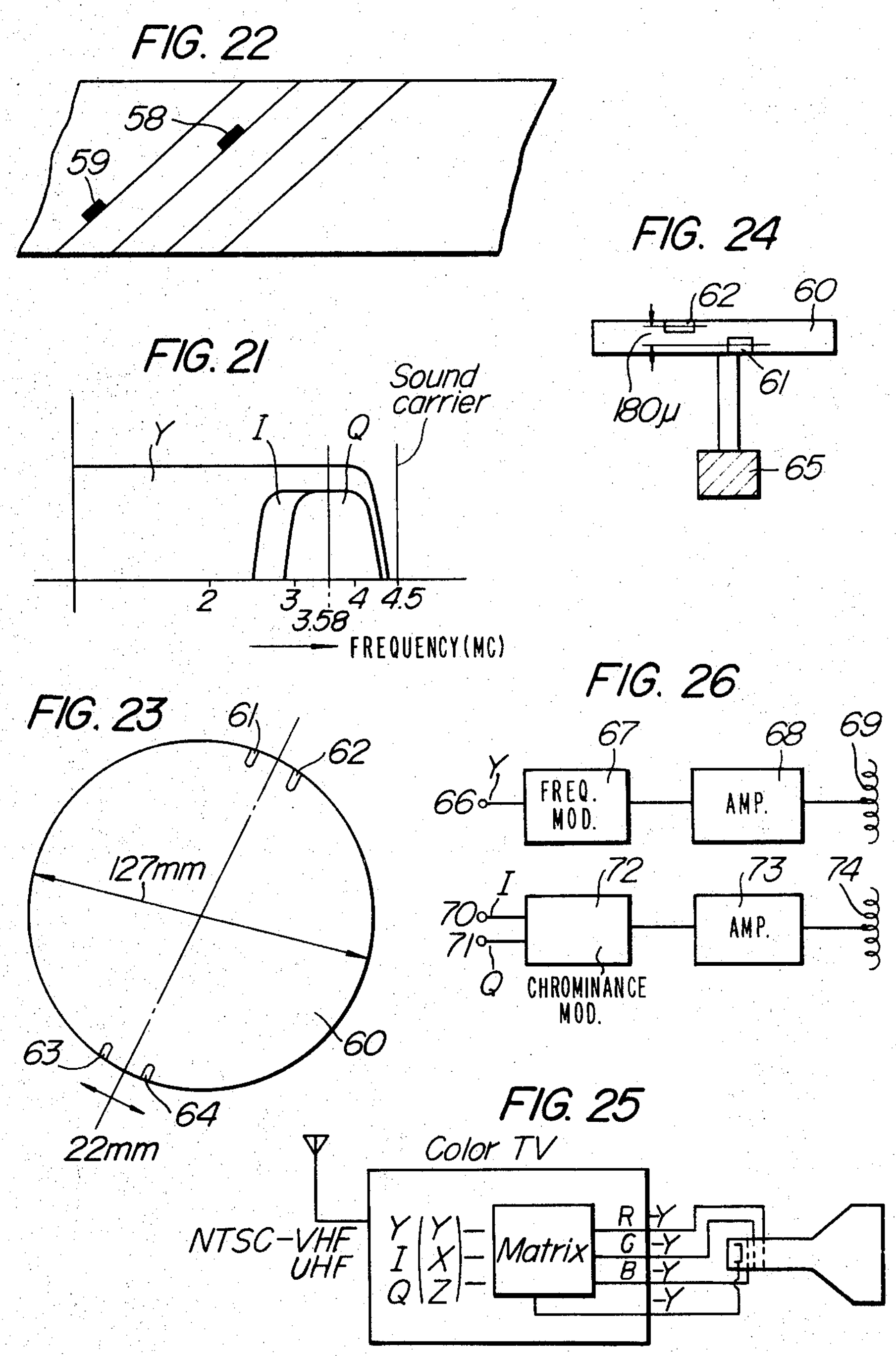
FIG. 21 is a diagram to illustrate respective bands occupied by each color information.
FIG. 22 shows tracks recorded on a magnetic tape by a magnetic recording and reproducing apparatus of two channel system color television signals according to this invention.
FIG. 23 is a top view of the rotary disc of the apparatus shown in FIG. 22.
FIG. 24 is a front view of the disc shown in FIG. 23.
FIG. 25 is a diagram of demodulation signals in an NTSC system color television receiver.
FIG. 26 is a block diagram of a magnetic recording and reproducing apparatus for two-channel system color television signal according to this invention during recording.

Generally, a color television signal is composed as follows. As shown in FIGS. 20 and 21, each color image output taken from cameras, each for R, G and V respectively, are converted to the following three components; firstly, a luminance signal Y having a band of 4 mc., secondly an I component having a band of 1.5 mc. and thirdly a Q component having a band of 0.5 mc.

The composite color television signal in the NTSC system is composed of the I and Q components and the Y component, in which the I and Q components are multiplexed on the upper frequency band of the Y component by being subjected to balance modulation by a subcarrier of 3.58 mc.

To record or to reproduce the two channels of the components (Y.I.Q.), (X.Y.Z), (G.R.B.) or the color difference signals and the luminance signal Y with two tracks, the disc of a conventional magnetic recording- and reproducing-apparatus of one head system or of two head system is rotated at half speed, namely, at a rate of 1800 r.p.m. or 900 r.p.m., with twice the number of heads, namely, with two heads or with four heads. Then the tracks made by the two heads 58 and 59 arranged similarly as shown in FIGS. 2 and 3 will be alternative tracks as shown in FIG. 22. By the color television signal of NTSC system, the images for two fields are recorded at half speed of the disc, namely, at 1800 r.p.m. or at 900 r.p.m. when the disc has two heads or four heads. As shown in FIG. 22, when the head 58 begins to record the second field, the head 159 begins to record the first field. Thus, two adjacent tracks can be recorded an a magnetic tape at any time, and enables two channel recording.

Accordingly two channel system color television recording- and reproducing-apparatus can be constructed by using the first channel for a luminance signal and the second channel for chrominance components.

As a two channel system magnetic recording- and reproducing-apparatus, it is possible to provide two magnetic heads parallel to each other to move on a magnetic tape. In FIGS. 23 and 24, a rotating disc 60 is of a diameter of 127 mm, and each distance between the respective gaps of magnetic heads 61, 62 and 63, 64 is 22 mm., and each difference in height of the respective pairs of the magnetic heads is 180$\mu$. Each of those heads provided with a tip of so-called alperm, which is a specific iron core material composed of 16 percent aluminum and 84 percent iron at the end of the ferrite core thereof, and has an impedance of approximately 3 K$\Omega$, and the width of the tracks to be recorded on a magnetic tape is designed to be 160$\mu$.A tape travels along the half portion of the periphery of the rotary disc 60 at a rate of 600 mm. per second, and the space between any adjacent recorded tracks is approximately 50$\mu$. A driving motor 65 for the rotary disc rotates in synchronism with the vertical synchronizing signal of an NTSC system signal, at a rate of 1800 r.p.m. The speed of a tape relative to the magnetic head is then approximately 12.5 m. per second. Accordingly, in the above construction, each pair of the magnetic heads 61, 64 and 62, 63 constitutes one channel respectively.

The Y component of a luminance signal or the similar G component of a green primary signal taken from an image receiver is recorded in one of the above two channels, and the two chrominance components are recorded in another channel by the modulation method above described.

An embodiment of this two channel system recording method will be explained with reference to FIGS. 26 and 27. The Y component introduced from a terminal 66 is modulated with a frequency modulator 67, and drives a magnetic head 69 via a record amplifier 68. On the other hand, the I and Q components which are introduced from terminals 70, 71 are modulated with a chrominance components modulator 72 according to this invention, and drives a magnetic head 74 via a record amplifier 73. The magnetic head 74 together with the magnetic head 69 performs a two channel recording on a magnetic tape.

Figures 27, 28, 29, 30:
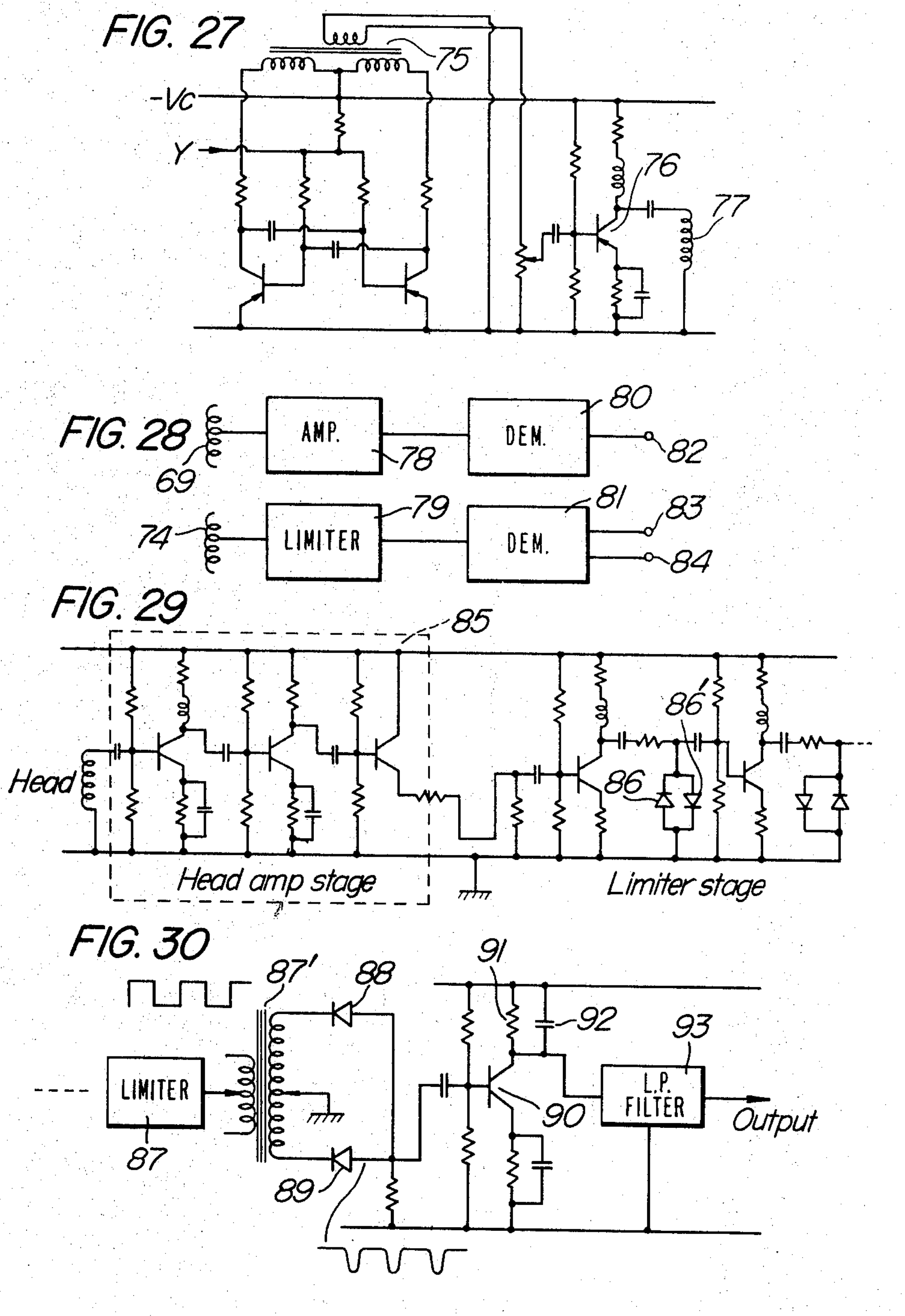
FIG. 27 is a circuit of an embodiment of the modulator and record amplifier shown in FIG. 26.
FIG. 28 is a block diagram of the apparatus shown in FIG. 22 during reproduction.
FIG. 29 is a circuit diagram of an embodiment of a reproduction amplifier and limiter stage shown in FIG. 28.
FIG. 30 is a circuit diagram of an embodiment of FM demodulator shown in FIG. 28.

In FIG. 27, a frequency modulator, which picks up a modulated signal, by applying a modulation signal Y to the common base of an astable multivibrator to vary the operation point of the base. This output is then picked up by a transformer 75, which is inserted in the collector circuit, and drives a magnetic head 77 via an emitter grounded type record amplifier 76. To reproduce the signal recorded according to the above described method as shown in FIGS. 28 through 30, each modulated higher frequency signal which is reproduced at the respective magnetic heads 69 and 74 is passed through circuits 78 and 79 constituting a reproduction amplifier and a limiter respectively, and is then passed through a frequency demodulation 80 and a chrominance components demodulator 81, wherein the first or the second demodulation method of this invention is used, thereby a luminance signal is obtained at a terminal 82 and chrominance components are obtained at terminals 83 and 84. In FIG. 29, there is shown a circuit comprising a reproducing head amplifier stage 85 consisting of two stages of an emitter-grounded type amplifier and one stage of an emitter follower, and multiple limiter stages having a limiter effect by connecting two diodes 86, 86' in parallel and in opposite directions to each other.

An embodiment of the frequency demodulator using a transistor is shown in FIG. 30. As shown in FIG. 30, the output of a limiter 87 is introduced to diodes 88, 89 via a transformer 87'. A zero crossover signal is extracted at the output of the diodes 88, 89. A capacitor 92, in parallel with a collector resistance 91 of the collector of a transistor 90 which constitutes the next stage, is charged to a degree corresponding to the zero crossover signal. The original signals are reproduced by passing the mean level of the charge of the capacitor 92 through a low pass filter 93.

Two examples relating to color information recording and reproducing method with one channel, using the modulation and demodulation system of this invention, will be explained hereinafter.

Figure 31:
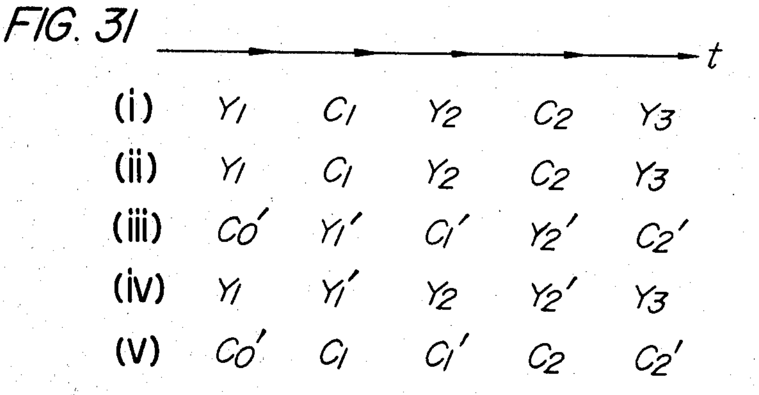
FIG. 31 is a diagram to illustrate the relation of a luminance signal and a chrominance signal of one channel system color television signals according to this invention with a time axis in a magnetic recording and reproducing apparatus.

This recording and reproducing method is to make it possible to record and to reproduce a color information from one channel system magnetic recording and reproducing apparatus, by line sequential switching of a luminance signal and chrominance components I. Q. (or X. Z.), which are obtained by receiving and decomposing a composite color television signal by NTSC system, or the R. G. B. primary colors signal derived from a color television camera, and by using a delay circuit. Namely, the luminance signal Y and the chrominance component C are recorded alternatively during each horizontal scanning period by time division system as illustrated in FIG. 31 (I). At the time when the reproducing operation is performed, the continuous alternative output (III) passes through a delay circuit having a delay time of one horizontal scanning period, and the output thereof is switched and mixed with a signal (ii) which is a normal luminance signal Y, Y′ as shown in FIG. 31 (iv) or a chrominance component C, C′ as shown in FIG. 31 (v). These signals are reproduced on a color picture tube.

Figure 32:
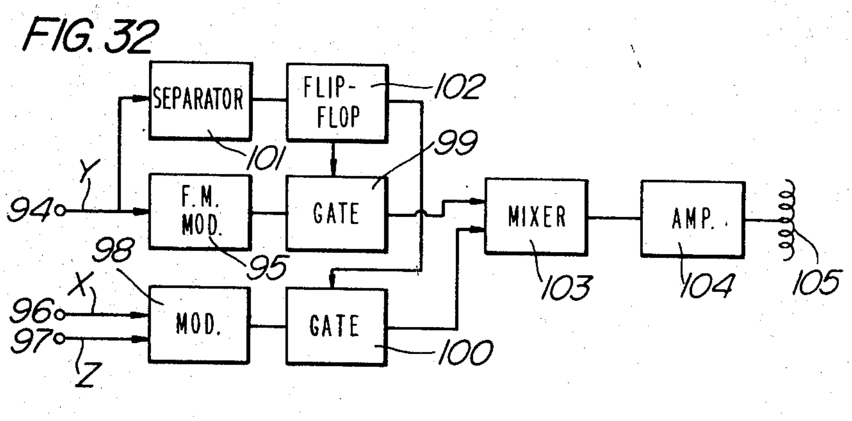
FIG. 32 is a block diagram of the apparatus shown in FIG. 31 during recording.
Figure 33:
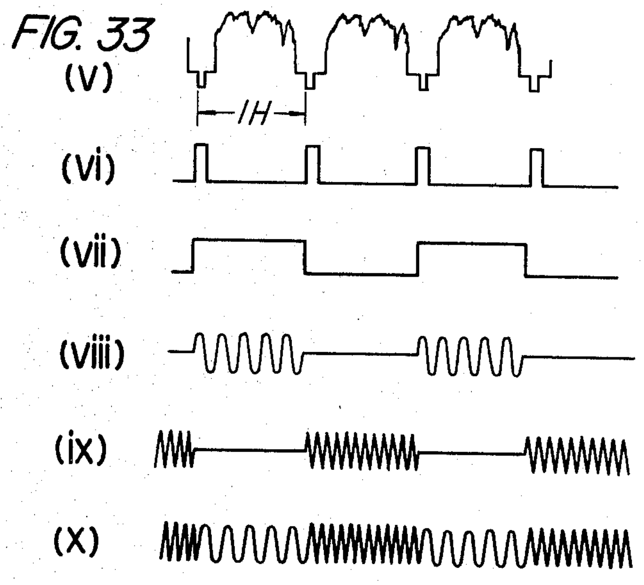
FIG. 33 shows operation wave forms of the block diagram shown in FIG. 32.

One embodiment of this one channel system recording method will be explained referring to FIGS. 32 to 34. The Y component is modulated by a frequency modulator 95 having a center carrier frequency of 3 mc., and the X, Z components are modulated by a chrominance components modulator 98 which uses the first or the second method of this invention. Each modulated output is introduced to gate circuits 99 and 100. From a part of the Y component input (FIG. 33 (*v*)) a horizontal synchronizing signal (FIG. 33 (*vi*)) is produced by a horizontal synchronizing signal separator 101, which signal triggers the next stage flip-flop circuit 102, and the output (*vii*) of the circuit 102 gates two gate circuits 99 and 100 alternatively for each one horizontal scanning period, one gate output is shown as (VIII) and the other as (IX) and a series of signals (FIG. 33 (*x*)) is produced at the next stage mixer 103. This series of signals drives a magnetic head 105 via a record amplifier 104.

FIG. 34 shows a transistorized practical circuit comprising the gate circuits 99, 100, the horizontal synchronizing signal separator 101, the flip-flop circuit 102 and the mixer 103. The modulated luminance signal and the modulated chrominance components are introduced from terminals 96 and 97. During reproduction, the high frequency signal, to be reproduced by a reproducing head 106 enters a frequency demodulator 109 via a reproduction amplifier 107 and a limiter 108 as illustrated in FIGS. 35 to 38. Assuming that the output of the demodulator varies linearly with respect to frequency, there occurs a remarkable difference between the output of the luminance signal modulation center carrier frequency 3 mc. and the chrominance component modulation centre carrier frequency 1 mc. Such demodulated signals are shaped to a rectangular wave form by a wave shaping circuit 110, and the differentiated output of the shaped waves triggers a next stage flip-flop 111, whereby gate pulses are produced. The output of the limiter 108 is directly introduced, or is introduced through a one horizontal scanning period delay circuit 112, to four gate circuits 113, 114, 115 and 116, and the outputs of those gate circuits provide a series of Y and X·Z high frequency modulated signals. These signals in mixers 117 and 118, respectively provide Y·X·Z signals as demodulated signals to terminals 121, 122 and 123 by a demodulator 119, or by a demodulator 120 using the first or the second demodulation method of this invention.

Figure 37:
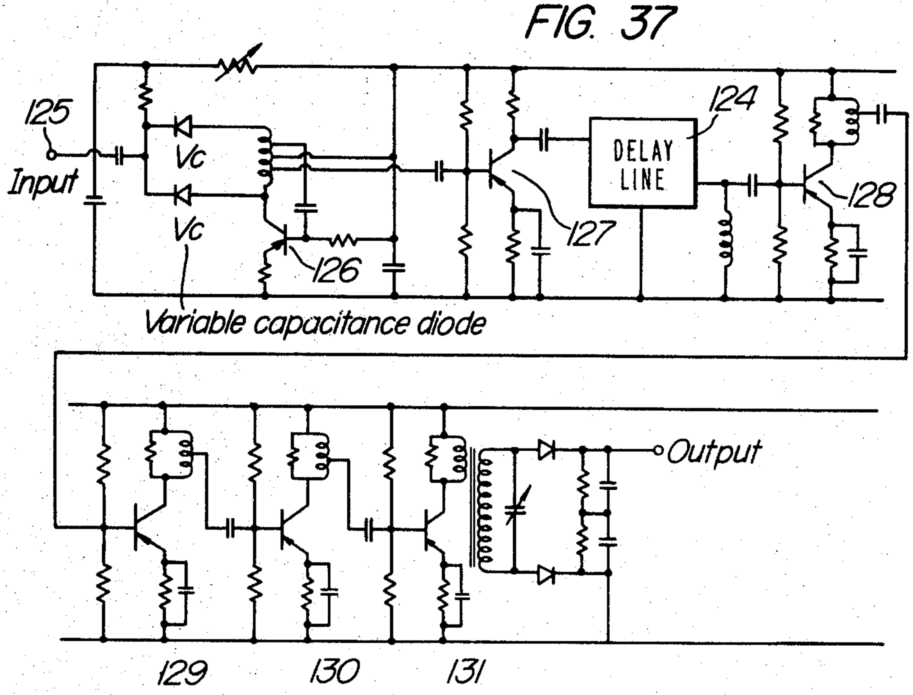
FIG. 37 is an embodiment of the delay circuit of FIG. 35.
Figure 38:
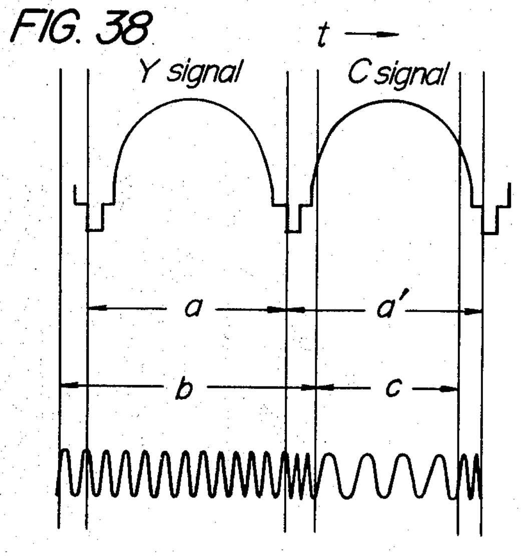
FIG. 38 is a diagram to illustrate the relation of luminance signal and chrominance components in the block diagram with a time axis.

An embodiment of the horizontal scanning period delay circuit is a circuit including an ultrasonic delay line utilizing a crystal that causes a shear wave, as shown in FIG. 37, having a delay line element 124 of terminal resistance of 1 KΩ and a delay time of 63.5 μsec. of one horizontal scanning period. A signal to be delayed is introduced from an input terminal 125, and frequency modulated by a 30 mc. modulator 126 and delayed by the delay line 124 via an interstage amplifier 127, and then demodulated by a Foster Seeley type demodulator via post stage amplifiers 128 to 131. Further, during recording, it is preferable, to prevent missing the horizontal synchronizing signals, to make the ratio of the band width of a luminance signal to that of chrominance signal C large such as *b:c* rather than the ratio *a:a′* where the band width is one horizontal scanning period.

The band width which is possible to be recorded by the above described two channel system or one channel system magnetic recording and reproducing apparatus is from five to six mc., and the output voltage of the magnetic head during reproduction is approximately 1 mv. peak-to-peak at 4 mc., and is approximately 2 mv. peak-to-peak at 3 mc.

In applying the first or the second modulation means, according to this invention, as a modulator for chrominance components, the center carrier frequency is set at 1 mc., during non-modulation, and the reproducing band from 3 to 4 mc. is sufficient taking a zero crossover transmission into consideration.

A both-sidebands reproduction is possible by using a frequency modulator for a luminance signal, and by setting the center carrier frequency at from 2 to 3 mc. during nonmodulation period.

Further, in applying the modulation method of this invention, a fixed multi channel type magnetic head such as an audio tape recorder can be used instead of the above described rotary head type magnetic record reproducing apparatus. In this case, the ratio of the relative speed between the magnetic head and a tape to a video information is necessarily set at 1 to 2 m./1 mc.

The inventors have confirmed, by experiments, the fact that the modulated wave, according to the first modulation method of the invention, can be effectively transmitted and reproduced if the spectrum of the modulated wave includes at least the center carrier frequency, the second higher harmonic and the third higher harmonic intelligibly.

In the above description, the application of this invention for a color television signal in NTSC system is explained. However it is apparent that this invention is also applicable in various color television systems such as PAL system and SECAM system without deviating from the scope of this invention.

In the above, embodiments of this invention have been described, and this invention should not be limited to such embodiments, and various modifications thereof can be made without deviating from the spirit of this invention.

What we claim is:

1. A system for transmitting or recording and reproducing a plurality of signals comprising a modulator having a pulse oscillation circuit provided with first and second signal generating elements to perform a free running oscillation, said first element determining positive going zero crossover points of the output pulses of said pulse oscillation circuit, means to apply first and second modulation signals to said modulator, first means to control a control electrode of said first element corresponding to the level of said first modulation signal to modulate the temporal positions of the positive going zero crossover points of said output pulses, said second element determining negative going crossover points of the output pulses of said pulse oscillation circuit, and second means to control a control electrode of said second element corresponding to the level of said second modulation signal to modulate the temporal positions of the negative going zero crossover points of the output pulses, means for transmitting or recording and reproducing the output wave of said modulator, means for detecting the temporal positions of the positive and negative going zero crossover points of said rectangular wave thus transmitted or recorded, means for reproducing a first pulse wave whose respective positive going edges and negative going edges correspond to said detected respective zero crossover points; means for generating a second pulse wave of which a positive going edge and a negative going edge correspond to each of said detected zero crossover points; means for demodulating one of said two modulation signals by passing said first and second pulse waves through a low-pass filter after said two pulse waves are added by an adder; and means for demodulating the other of said two modulation signals by passing said first and second pulse waves through another low-pass filter after said second pulse waves are subtracted from said first pulse waves by a subtractor.

2. A system for transmitting or recording and reproducing a plurality of signals according to claim 1, wherein the means for generating said second pulse wave includes a differential transformer provided with a central tap on the secondary thereof which generates pulses of a certain width in said secondary and two diodes which unify the polarity of said pulses.

3. A system for transmitting or recording and reproducing a plurality of signals according to claim 1, the system further comprising means having two recording and reproducing channels to record and reproduce a color television signal respectively; means for separating said color television signal into a luminance signal and first and second chrominance components having a different chromaticity axis respectively; means for recording and reproducing said luminance signal on the first channel of said recording and reproducing means; means for recording and reproducing said first and second chrominance components on the second channel of said recording and reproducing means, said first modulation signal corresponding to said first chrominance component, and second modulation signal corresponding to the second chrominance component; and means for supplying both the thus reproduced luminance signal and two chrominance components to a color television receiver.

4. A system for transmitting or recording and reproducing a plurality of signals according to claim 1, the system further comprising means having one recording and reproducing channel to record and reproduce said color television signal; means for separating said color television signal into a luminance signal and first and second chrominance components having a different chromaticity axis respectively; means for converting said two chrominance components into a line sequential signal by switching the components every horizontal scanning period; means for recording and reproducing said luminance signal and said line sequential signal on the channel of said recording and reproducing means, said first modulation signal corresponding to the first chrominance component and said second modulation signal corresponding to the second chrominance component; means for delaying the thus reproduced line sequential signal by one horizontal scanning period; means for separating the reproduced line sequential signal and the delayed line sequential signal into two chrominance components of the same information during two sets of horizontal scanning periods; and means for supplying the thus reproduced luminance signal and said two chrominance components of the same information to a color television receiver.

5. A system for transmitting or recording and reproducing a plurality of signals according to claim 3, wherein said recording and reproducing means comprises a rotary head type magnetic recording and reproducing mechanism having a rotary disc on which periphery at least two sets of magnetic heads are arranged equidistantly, the scanning period of one set of said magnetic heads which scans continuously and obliquely across a magnetic tape being slightly longer than two vertical scanning periods of said color television signal.

6. A system for transmitting or recording and reproducing a plurality of signals according to claim 4, wherein said recording and reproducing means comprises a rotary head type magnetic recording and reproducing mechanism having a rotary disc on which periphery at least two sets of magnetic heads are arranged equidistantly, the scanning period of one set of said magnetic heads which scans continuously and obliquely across a magnetic tape being slightly longer than two vertical scanning periods of said color television signal.

7. A system for transmitting or recording and reproducing a plurality of signals according to claim 6, the system comprising: means for modulating a pulse wave of a given repetition period by a first modulation signal; means for deriving the temporal positions of zero crossover points of said modulated pulse wave; means for pulse-width modulating said modulated pulse wave, utilizing as a reference said derived temporal positions by a second modulation signal; means for transmitting or recording and reproducing the modulated signal; means for detecting said reference zero crossover points from said transmitted or recorded signal; means for demodulating said first modulation signal by demodulating said frequency modulated component corresponding to the period of the time between said detected reference zero crossover points; means for detecting the other zero crossover points lying between said reference zero crossover points; means for providing a composite component of said first and second modulation signals by demodulating said pulse-width modulated component corresponding to the period of time between said respective reference zero crossover points and each of the other zero crossover points; and means for providing said second modulation signal by subtracting said first modulation signal from the composite components of said first and second modulation signals.

8. A system for recording and reproducing a plurality of signals according to claim 7, the system further comprising: means having two recording and reproducing channels to record and reproduce a color television signal; means for separating said color television signal into a luminance signal and first and second chrominance components having different chromaticity axes, respectively; means for recording and reproducing said luminance signal on the first channel of said recording and reproducing means; means for recording and reproducing said first and second chrominance components on the second channel of said recording and reproducing means, said first modulation signal corresponding to the first chrominance component and said second modulation signal corresponding to the second chrominance component; and means for supplying both the thus reproduced luminance signal and the two chrominance components to a color television receiver.

9. A system for transmitting or recording and reproducing a plurality of signals according to claim 6, the system also comprising: means for modulating a pulsewave of a given repetition period by a first modulation signal; means for deriving the temporal positions of zero crossover points of said modulated pulse wave; means for pulse-width modulating said modulated pulse wave, utilizing as a reference said derived temporal positions by a second modulation signal; means for transmitting or recording and reproducing the modulated signal; means having one recording and reproducing channel to record and reproduce a color television signal; means for separating said color television signal into a luminance signal and first and second chrominance components having a different chromaticity axis respectively; means for converting said luminance signal and two chrominance components into a line sequential chrominance signal by switching the luminance signal and the components every horizontal scanning period; means for recording and reproducing said line sequential chrominance signal on the channel of said recording and reproducing means, said first modulation signal corresponding to the luminance signal and the second modulation signal corresponding to the two chrominance components, means for delaying the thus reproduced line sequential chrominance signal by one horizontal scanning period; means for separating the reproduced line sequential chrominance signal and the delayed line sequential chrominance signal into a luminance signal and two chrominance components of the same information during two sets of horizontal scanning periods; and means for supplying the thus reproduced luminance signal and said two chrominance components of the same information to a color television receiver.

10. A system for recording and reproducing a plurality of signals according to claim 8, wherein said recording and reproducing means comprises a rotary head type magnetic recording and reproducing mechanism having a rotary disc on which periphery two sets of magnetic heads are arranged equidistantly, the scanning period of one set of said magnetic heads which means continuously and obliquely across a magnetic tape being slightly longer than two vertical scanning periods of said color television signal.

References Cited

UNITED STATES PATENTS

| | | | |
|---|---|---|---|
| 2,471,168 | 5/1949 | Posthumus | 179—15 |
| 2,824,908 | 2/1958 | Palmer | 179—15 |
| 2,860,185 | 11/1958 | Treadwell | 179—15 |
| 2,921,976 | 1/1960 | Johnson | 178—6.6 |
| 2,950,352 | 8/1960 | Bleck | 179—100.2 |
| 3,009,025 | 11/1961 | Takayanagi et al. | 179—100.2 |
| 3,114,001 | 12/1963 | Newell | 178—5.4 |
| 3,388,214 | 6/1968 | Eilers et al. | 178—5.6 |

ROBERT L. GRIFFIN, Examiner

R. P. LANGE, Assistant Examiner

U.S. Cl. X.R.

178—66; 175—54

UNITED STATES PATENT OFFICE

CERTIFICATE OF CORRECTION

Patent No. 3,535,433 Dated October 12, 1970

Inventor(s) Ichiro ARIMURA et al

It is certified that error appears in the above-identified patent and that said Letters Patent are hereby corrected as shown below:

Two of the priority applications are not listed and should be as follows:

Japan, Patent Appln. N° 3484/66 filed Jan. 18, 1966 and
Japan, Patent Appln. N° 8638/66 filed Feb. 15, 1966.

Signed and sealed this 28th day of December 1971.

(SEAL)
Attest:

EDWARD M.FLETCHER,JR.
Attesting Officer

ROBERT GOTTSCHALK
Acting Commissioner of Patents